United States Patent [19]

Easley et al.

[11] Patent Number: 4,849,703

[45] Date of Patent: Jul. 18, 1989

[54] METHOD AND APPARATUS FOR GENERATING A DATA SAMPLING CLOCK LOCKED TO A BAUD CLOCK CONTAINED IN A DATA SIGNAL

[75] Inventors: Matthew F. Easley, Decatur; German E. Correa, Marietta; Randy D. Nash, Dacula; Cynthia A. Panella, Alpharetta; Taruna Tjahjadi, Norcross, all of Ga.

[73] Assignee: Hayes Microcomputer Products, Inc., Norcross, Ga.

[21] Appl. No.: 176,692

[22] Filed: Apr. 1, 1988

Related U.S. Application Data

[62] Division of Ser. No. 885,927, Jul. 15, 1986.

[51] Int. Cl.[4] .......................... H03K 1/17; H03K 7/00
[52] U.S. Cl. .......................................... 328/63; 375/8; 375/120; 328/155; 307/262; 307/511
[58] Field of Search ............... 307/269, 262, 271, 522, 307/524, 529, 511; 328/14–16, 140, 150, 155, 63; 375/8, 118–120; 331/1 A; 455/76

[56] References Cited

U.S. PATENT DOCUMENTS

| | | | |
|---|---|---|---|
| 4,280,099 | 7/1981 | Rattlingourd | 328/63 |
| 4,400,817 | 8/1983 | Sumner | 375/119 |
| 4,455,661 | 6/1984 | Qureshi | 375/8 |
| 4,472,818 | 9/1984 | Zapisek et al. | 375/110 |
| 4,488,294 | 12/1984 | Christensen et al. | 370/84 |
| 4,538,119 | 8/1985 | Ashida | 331/1 A |
| 4,570,125 | 2/1986 | Gibson | 375/120 |
| 4,620,294 | 10/1986 | Leung et al. | 375/8 |
| 4,680,780 | 7/1987 | Agoston et al. | 375/120 |

FOREIGN PATENT DOCUMENTS

| | | |
|---|---|---|
| EP142302A | 5/1985 | European Pat. Off. . |
| EP171856A | 2/1986 | European Pat. Off. . |
| 60-167551(A) | 8/1985 | Japan . |
| WO85/00255 | 1/1985 | World Int. Prop. O. . |

*Primary Examiner*—Stanley D. Miller
*Assistant Examiner*—Richard Roseen
*Attorney, Agent, or Firm*—Jones, Askew & Lunsford

[57] ABSTRACT

An improved baud clock recovery, synchronization and data sampling circuit for a modem. A CODEC (41) samples the incoming signal at a rate determined by the sample clock output of a presettable counter (236). The sampled signal is then squared (231) and bandpass filtered (232) to provide a recovered baud clock. A detector (233) signals the positive going zero-crossing points of the recovered baud clock. A lead/lag calculator (234) determines which of the signal samples is nearest the zero-crossing point. The calculator (234) then determines whether this and every subsequent 12th sampling point leads or lags the zero-crossing point by inspecting the sign of the recovered baud clock and adjusts the preset inputs of the counter (236) to cause the sample points to occur at the zero-crossing point.

31 Claims, 5 Drawing Sheets

METHOD AND APPARATUS FOR GENERATING A DATA SAMPLING CLOCK LOCKED TO A BAUD CLOCK CONTAINED IN A DATA SIGNAL

This is a divisional application of U.S. patent application Ser. No. 885,927, filed July 15, 1986, by Sweitzer et al., entitled "Modem With Improved Digital Signal Processor".

TECHNICAL FIELD

The present invention relates to digital signal processing and control apparatus for modems. More particularly, the present invention provides a variety of improvements in digital signal processing and control apparatus used in medium speed modems which reduce the complexity and memory size requirement to implement such a modem employing digital signal processing.

BACKGROUND OF THE INVENTION

In recent years the use of digital signal processing apparatus to implement medium and high speed modems has become very popular. Digital signal processing offers a less expensive way to implement such modems when compared to older techniques employing analog circuitry. Most medium and high speed modems encode information into changes in phase or changes in phase and amplitude between successive keyings of the transmitter (baud times). Naturally, the more bits which are encoded per baud time, the more complex the phase/amplitude constellation for the transmission becomes.

As the complexity of the encoded constellation increases, the allowable margin for error for phase detecting apparatus of the receiving modem decreases. Additionally, in most popular data transmission arrangements used in modems throughout the world, modems which transmit at speeds in excess of 1200 bits per second normally include multiple points in the encoding constellation which are at the same phase but of different amplitudes. Therefore, the amplitude distortion which is tolerable in such modems is limited.

Digital signal processing has been particularly useful in implementing such modems because of the relatively high cost of precision analog components necessary to construct circuits in the transmission path, particularly filters with minimal phase distortion over the bandwidth of interest.

Additionally, the use in digital signal processing schemes in such modems overcomes the severe problems of component value changes which accompany complex analog filters, including changes which are a function of ambient temperature and drift which occurs over time.

Most digital signal processing schemes for medium to high speed modems in the prior art have been straight forward implementations of the results of conventional digital signal processing theory. This is known to those skilled in the art: as a general first approximation, the greater the highest frequency of interest in a digital signal processing system, the more complex the system becomes. In general, as the Q of filters used in such a system increases, and the frequency of the signals being operated upon increases, the bit length of the digital filters and the processing time required for the filter operations increase. This has led to rather complex implementation of medium and high speed modems employing digital signal processing.

More recently, microprocessors, such as the TMS32010 currently manufactured by Texas Instruments Corporation, which are specifically designed to handle digital signal processing chores have become available. Such processors have an architecture and instruction set particularly suited for these jobs, including the ability to perform a relatively large number of multiply operations in a relatively short period of time. Naturally, in implementing a modem employing digital signal processing, all the digital signal processing necessary must be executed in real time. Additionally, if the designer simply implements the conventional teachings with respect to use of dedicated digital signal processing microprocessors, such as the TMS32010, and the control schemes normally used to provide the intelligence of an intelligent modem, implementation of such a scheme in the environment of an intelligent modem, for example one of the type shown in U.S. Pat. No. 4,431,867, will lead to a system of large memory requirements and inefficient use of some of the system resources. Thus, there is a need in the field of medium to high speed modems employing digital signal processing to provide a system which makes the maximum use of available resources, and in particular does not unnecessarily duplicate memory implementations to service both the memory needs of the digital signal processing apparatus and the processor implementing the normal intelligent functions of an intelligent modem.

Furthermore, there is a need for efficient and less complex implementation of the required digital signal processing functions which take advantage of the fact that only discrete phase/amplitude points are of interest in the ultimate transfer of, information in a system employing such modems. Additionally, there is a need for the simplest possible circuit topology which can do the job required and take advantage of the power of a dedicated digital signal processor (DSP) such as the TMS32010.

In view of the relative power of an outboard DSP microprocessor and the available processing power of a conventional microprocessor used to implement the other intelligent functions of a modem, there is a need to maximize the use of the conventional microprocessor in constructing such a modem and minimize the complexity of the circuitry necessary to interconnect these components of the system. It is therefore desirable to design an implementation of a modem which allows the collection of the majority of this additional circuitry into a single specialized integrated circuit such as a gate array.

The preferred embodiment of the invention disclosed herein is one which is designed to implement standard V0.22/V0.22 bis of the CCITT. As is known to those skilled in the art, the 2400 bit per second mode of the V0.22/V0.22 bis modem is 600 baud, 4 bits per baud, using 1200 and 2400 Hz carriers for the originate and answer modes, respectively. Prior art designs of a transmit pulse shaping digital filter for such a modem require a transmit filter to be implemented with a string of registers of a given length to handle the 2400 Hz carrier. However, since the signal characteristic near the center of a baud time is the only truly critical result in transmitting the signal for such a modem, the inventors of the present invention have discovered that it is possible to dynamically change coefficients at the taps on the filter in order to implement the same transfer function in a smaller device.

Additionally, the phase/amplitude constellation employed in this type of modem employs only two discrete amplitudes along a radial vector drawn from the origin of the phase plane. Therefore, it has been discovered that it is only necessary to employ two bits to represent the amplitude value for such a signal, providing for two positive amplitude values and two negative amplitude values.

Additionally, conventional digital signal processing schemes for such modems have adopted two, or one relatively complex multiple frequency digital signal generator to transmit the two carriers required for originate and answer modes. It is desirable to provide a system in which a single carrier frequency is provided, using a constant sampling frequency which allows changing only the transmit filter characteristics in order to select between the carriers used for originate and answer modes.

Also, as is known to those skilled in the art, modems of this type often employ mu-law codecs as the analog-to-digital and digital-to-analog converters. Mu-law codecs employ nonlinear amplitude transfer functions in order to provide amplitude compression. It is therefore necessary, when transmitting, to eventually convert the linear phase-and-amplitude modulated digital signal into a mu-law digital signal. Prior art schemes for converting the linear signal into a mu-law signal have tended to be complex and require significant processor time and memory storage. Therefore, there is a need for a simpler linear-to-mu law conversion process which is usable in the environment of a modem.

Conventional modems using digital signal processing circuits have employed conventional digital phase-locking techniques which tend to converge slowly. Additionally, quick phase-locking for baud clock recovery is desirable in a V0.22/V0.22 bis modem. Lastly, it is very common in modems to employ automatic gain control so that the digital signal processing apparatus can adequately detect incoming signals of relative weakness. Prior art modems employ conventional automatic gain circuitry in which the error signal used to determine amplification of the incoming signal is directly proportional to the difference between a predetermined desired amplitude and the amplitude of the incoming signal. Because of the relatively high speed of information transfer in a 600 baud modem, it is necessary for the automatic gain control (AGC) circuits to have relatively fast attack and release times in order to track variable magnitude signals coming through the telephone network. The use of fast attack AGC circuits necessarily means that such circuits tend to be underdamped in order to achieve the fast attack time characteristic. This, in turn, has led to a common problem with AGC circuits in conventional modems of error bursts as a result of sudden drops in amplitude of the incoming signal. The inventors of the present invention have discovered that such error bursts often result not from the inability to detect low level signals, as might be expected, but rather from the fact that the AGC circuits overshoot the final needed amplification factor, which causes the detector to be unable to detect and decode incoming data until the underdamped AGC circuit settles to a final value.

Therefore, there is a need in the art of modem employing DSP to provide an improved AGC circuit which will implement the necessary fast attack to retain the input signal at an acceptable level which will not overshoot in response to a relatively sudden drop in incoming signal amplitude.

SUMMARY OF THE INVENTION

The present invention provides a modulator-demodulator (modem) with improved digital signal processing capability. Broadly stated, the present invention may be characterized as a modem which uses a first microprocessor to perform interfacing with a data terminal and control the overall operation of the modem, a second microprocessor which is dedicated to the processing of incoming and outgoing signals, and a logic gate array, which interfaces between the two microprocessors and a coder-decoder (codec), and also performs other logic functions.

More particularly described the present invention may be characterized as a method of using a logic gate array to interface between two microprocessors performing different functions. The logic gate array stores data which is to be transferred from one microprocessor to another processor, provides flags to both microprocessors to indicate that data is available, and resets the flags to indicate that the data has been read.

The present invention may also be characterized as a modem which generates a second of the two standard PSK/QAM carrier frequencies by digitally sampling (beating) the first of the two carrier frequencies with a reference signal and then filtering out the undesired carrier frequency.

Also, the present invention may be characterized as a modem which uses a zero crossing detector to enable the recovered baud clock to quickly lock onto the incoming signal.

Also, the present invention may be characterized as a modem which uses an autocorrelating frequency shift keyed (FSK) receiver to reliably detect the 2400 bit per second handshaking signal.

Also, the present invention may be characterized as a modem which uses a simple linear-to-mu conversion technique to compensate for the mu-law response of a coder-decoder (codec).

Also, the present invention may be characterized as a modem having an automatic gain control (AGC) which has a nonlinear response curve.

Also , the present invention may be characterized as a modem which uses a phase locked loop (PLL) having a locking window with an adjustable width so that the loop back signal is substantially jitter free.

Also , the present invention may be characterized as a modem which uses a finite impulse response (FIR) filter with selectively variable tap coefficients to perform transmitter pulse shaping.

DETAILED DESCRIPTION OF THE PREFERRED EMBODIMENT

Figure 1:
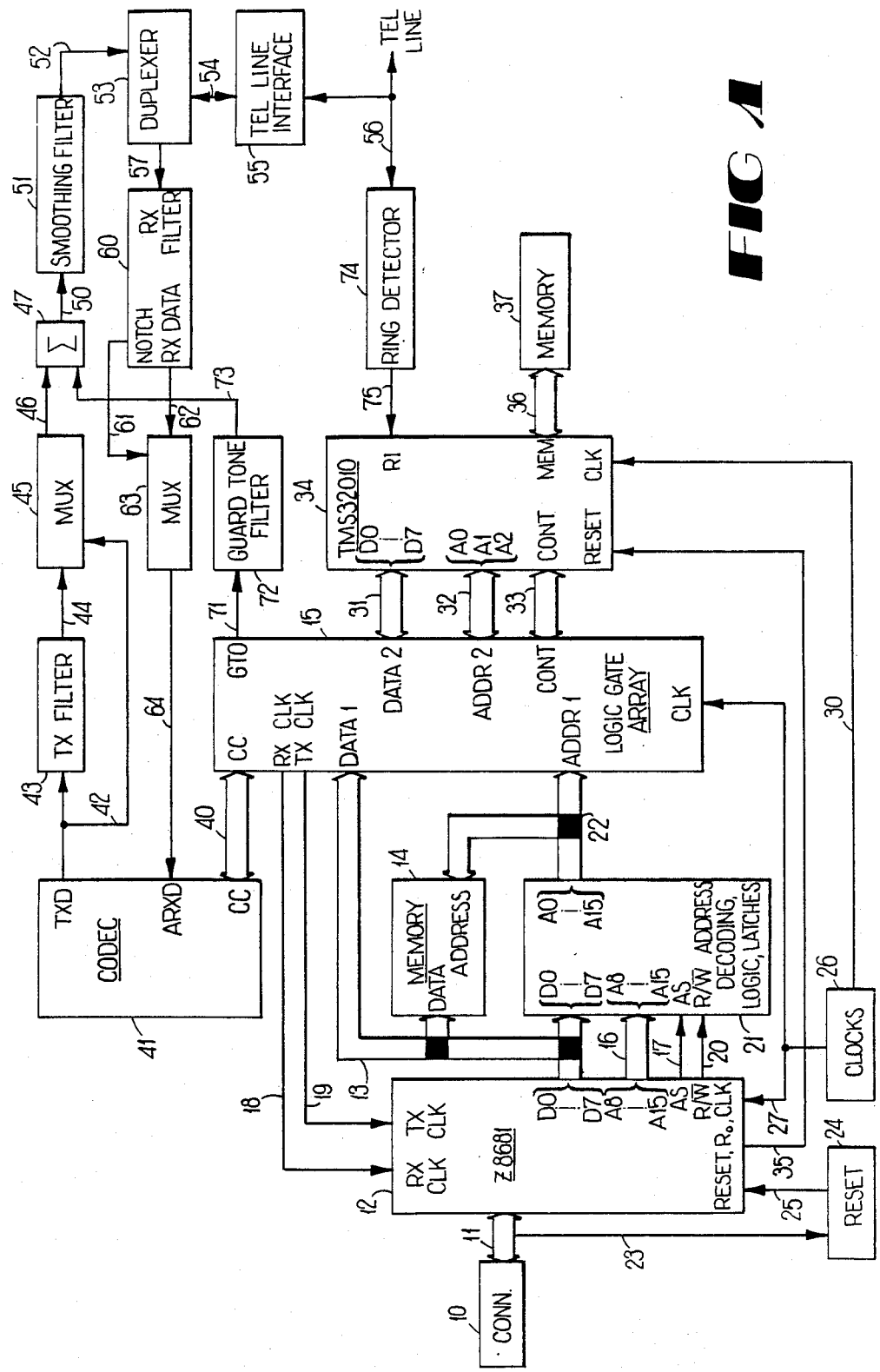
FIG. 1 is a block diagram of the preferred embodiment of the present invention.

Turn now to the drawings in which like numerals represent like components throughout the several figures. The invention covered by the claims is disclosed in FIG. 6 and the corresponding text for FIG. 6. FIG. 1 is a block diagram of the preferred embodiment of the preferred embodiment. Processor 12 is a microprocessor such as the Z8681 manufactured by Zilog, Inc., Campbell, Calif. Details of operation of the Z8681 microprocessor are published by the manufacturer. An external device connector 10 is connected by bus 11 to processor 12. External device connector 10 is typically connected to a data terminal (not shown) such as a digital computer. Bus 11 typically carries such signals as transmitter clock, receiver clock, transmitted data, received data, data terminal ready, etc. One input/output port of processor 12, labeled D0 through D7, is connected by 8 bit bus 13 to a memory 14, the logic gate array 15, and the command and address decoding, logic, and latches 21.

Construction, programming, and operation of a modem containing a processor, such as processor 12, to interface with an external device connected to connector 10 are described in U.S. patent application Ser. No. 792,520, filed Oct. 29, 1985, entitled "Improved Modem Controller", and U.S. patent application Ser. No. 798,822, filed Nov. 18, 1985, entitled "Improved Synchronous/Asynchronous Modem", both of which are assigned to the assignee of the present invention and both of which are hereby incorporated herein by reference.

Memory 14 contains a read only memory (ROM) and a non-volatile random access memory (NOVRAM). Memory 14 contains the operating instructions for processor 12, user selected configuration parameters and telephone numbers and temporarily stored data.

An output port, labeled A8 through A15, of processor 12 is connected by 8 bit bus 16 to command and address decoding, logic, and latches 21. An address strobe (AS) output of processor 12 is connected by conductor 17 to the address strobe input of decoding, logic, and latches 21. The read/negated write output of processor 12 is connected by conductor 20 to decoding, logic and latches 21. The output of decoding, logic and latches 21 is connected by bus 22 to the address inputs of memory 14 and the address inputs (ADDR1) of gate array 15.

One conductor 23 of bus 11 is connected to the input of reset circuit 24. The output of reset circuit 24 is connected by conductor 25 to the reset input of processor 12. Reset circuit 24 is both responsive to a hardware reset signal on conductor 23 and also responsive to the power supply (not shown) voltage. Reset circuit 24 resets processor 12 in response to a reset signal on conductor 23 and in response to excessive voltage fluctuations in the power supply.

A clock 26 provides an 11.52 MegaHertz clock on conductor 27 to processor 12 and gate array 15. The data to input/output of gate array 15 is connected by 8 bit bus 31 to the D0 through D7 input/outputs of processor 34. In the preferred embodiment, processor 34 is a TMS 32010 digital signal processor, manufactured by Texas Instruments, Dallas, Tex. Details of operation of processor 34 are published by the manufacturer.

The A0 through A2 outputs of processor 34 are connected by 3 bit bus 32 to the address 2 (ADDR2) inputs of gate array 15. Control signals (read, write, and interrupt) are exchanged between gate array 15 and processor 34 over bus 33. The reset output of processor 12 is connected by conductor 35 to the reset input of processor 34. Clock 26 provides a 20 MegaHertz clock to processor 34 over conductor 30. Processor 34 is connected by bus 36 to ROM 37. ROM 37 contains the operating instructions for processor 34. Means of addressing and reading ROM 37 over bus 36 are well known to those skilled in the art.

Gate array 15 is connected to coder-decoder (codec) 41 by 5 bit bus 40. Bus 40 carries the codec clock, digital transmit data signal from gate array 15 to codec 41, the transmit data strobe from gate array 15 to codec 41, the received data strobe from gate array 15 to codec 41, and the digital received data signal from codec 41 to gate array 15.

Codec 41 comprises a mu-law analog-to-digital (A/D) and digital-to-analog (D/A) converter, and anti-aliasing filters for both incoming and outgoing signals. Codecs are widely used in the telecommunications field because quantization of noise is proportional to the input signal level and because the desired resolution can be obtained with fewer bits: 8 bits instead of, for example, 12 bits.

The analog output of codec 41 is connected by conductor 42 to the input of transmitter filter 43 and to the input of multiplexer 45. The output of transmitter filter 43 is connected by conductor 44 to a second input of multiplexer 45. When codec 41 is generating an answer tone, FSK carrier frequencies, or PSK data signals, the output of codec 41 is routed through transmitter filter 43. When codec 41 is generating dual-tone, multiple-frequency dialing signals, the output of codec 41 is routed around transmitter filter 43 through multiplexer 45 to summer 47. The output of multiplexer 45 is connected by conductor 46 to one input of summer 47. The output of summer 47 is connected by conductor 50 to the input of smoothing filter 51. The output of smoothing filter 51 is connected by conductor 52 to the input of duplexer 53. The input/output of duplexer 53 is connected by conductor 54 to the input/output of telephone interface 55. Telephone interface 55 is connected to a telephone line 56.

Gate array 15 provides a guard tone output over conductor 71 to the input of guard tone filter 72. The output of guard tone filter 72 is connected by conductor 73 to the other input of summer 47.

Means of construction and operation of transmitter filter 43, multiplexer 45, summer 47, smoothing filter 51, duplexer 53, and telephone interface 55 are well known to those skilled in the art.

The received data output of duplexer 53 is connected by conductor 57 to the input of receiver filter 60. Receiver filter 60 has a notch signal output connected by conductor 61 to one input of multiplexer 63 and a data band output connected by conductor 62 to the other input of multiplexer 63. The output of multiplexer 63 is connected by conductor 64 to the analog receive data input of codec 41. Means of construction and operation of receiver filter 60 and multiplexer 63 are well known to those skilled in the art.

Telephone line 56 is also connected to the input of ring detector 74. The output of ring detector 74 is connected by conductor 75 to the ring detector input of processor 34. Means of construction of ring detector 74 are well known to those skilled in the art.

Consider now the overall operation of the preferred embodiment shown in FIG. 1. Upon reset, processor 12 begins reading operating instructions from memory 14, and processor 34 begins reading operating instructions from memory 37. After the reset initialization of processors 12 and 34 is complete, processor 12 begins sending configuration operating instructions (such as the number of bits per second) to processor 34 via gate array 15. Gate array 15 raises a flag which tells processor 34 that data is available for it. Processor 34 reads the data from gate array 15 and loads the data into the selected register in its internal memory. Therefore, processor 12 controls the operation of processor 34 by loading the command registers in the RAM of processor 34 through gate array 15.

Processor 12 periodically polls gate array 15 by reading the flags in gate array 15 to determine if data is available from processor 34 or if processor 34 is ready to accept more data. Gate array 15 sends interrupts to processor 34 at the rate of 7200 interrupts per second. In response to the interrupts, processor 34 reads certain flags in gate array 15 to determine whether processor 34 is to send or receive data.

Assume now that there is transmit data available on connector 10. Processor 12 will read the data, reformat, if appropriate, data transmission format characters received with the data, and send the reformatted data to gate array 15. Gate array 15 will raise a flag which alerts processor 34 that data is available for it.

Gate array 15 also periodically generates interrupts to processor 34 to cause processor 34 to read these flags. In response to the interrupt, processor 34 will read the flag, determine that data is available, and instruct gate array 15 to send the data to it. When gate array 15 has sent the data to processor 34, it lowers the flag. This advises processor 34 that there is no new data in gate array 15 and also advises processor 12 that processor 34 has read the previously sent data.

Processor 34 performs scrambling of the data received from gate array 15 and, after compensating for the mu-law characteristics of codec 41, generates a digital signal which has phase and amplitude information corresponding to the data received from gate array 15. Processor 34 then sends this digital information to gate array 15. Gate array 15 then sends this information via bus 40 to codec 41. Codec 41 generates an analog signal which, via transmitter filter 43, multiplexer 45, summer 47, smoothing filter 51, duplexer 53 and telephone interface 55, is placed upon conductor 56 for transmission.

Analog received data on telephone line 56 is provided to codec 41 via telephone interface 55, duplexer 53, receiver filter 60 and multiplexer 63. Codec 41 generates a digital data signal corresponding to the phase and amplitude of the received analog data signal. Gate array 15 reads the data from codec 41 and sends this data to processor 34. Processor 34 compensates for the mu-law characteristics of codec 41, demodulates and descrambles the received data, and provides the descrambled received data to gate array 15. Gate array 15 then sends the descrambled received data to processor 12. Then, if appropriate, processor 12 reformats the asynchronous/synchronous data transmission characters from the incoming descrambled received signal and then provides the received serial data to connector 10.

Gate array 15 also provides, over conductors 18 and 19, the receive data clock (RXCLK) and the transmit data clock (TXCLK), respectively, to processor 12. In some modes of operation, it may be desirable for processor 12 to provide these clocks to the external device (not shown) connected to connector 10. Also, processor 12 uses these clocks to determine when to send data to or receive data from gate array 15.

Figure 2:
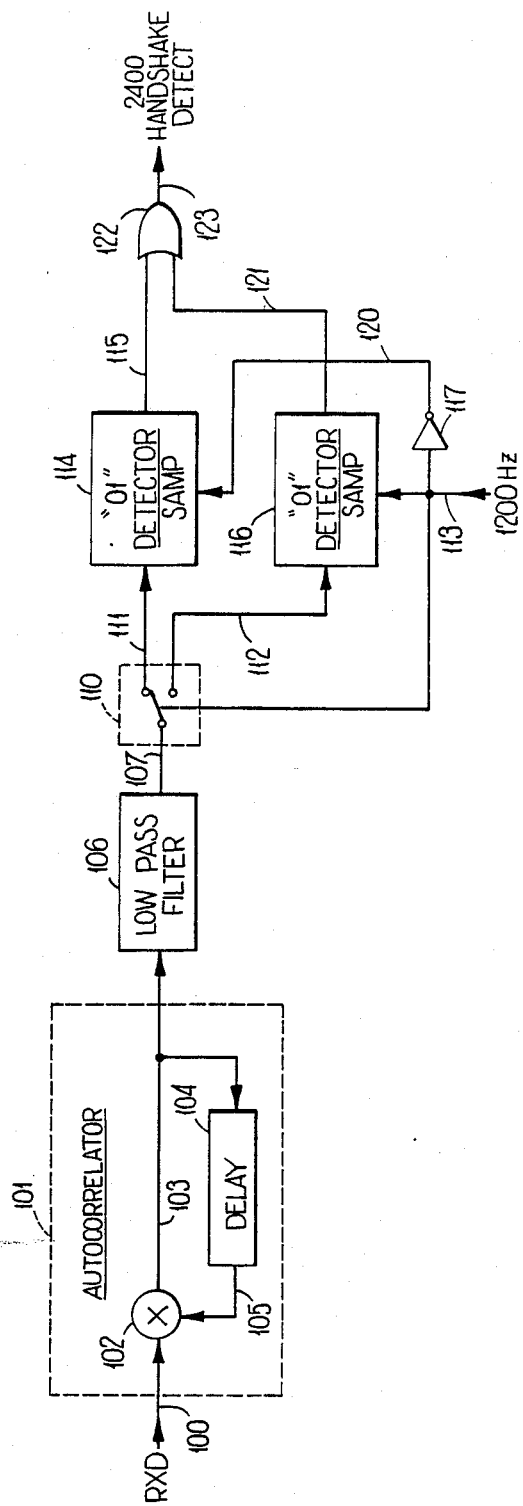
FIG. 2 is a block diagram of the 2400 bits per second handshake signal detector.

Turn now to FIG. 2 which is a block diagram of the 2400 bits per second (bps) handshake signal detector. The 2400 bps handshake signal comprises repeating series of unscrambled "0011" bits. The 2400 bps handshake detector of FIG. 2 is implemented, in digital fashion, in processor 34. The received data is provided to an autocorrelator 101 via signal path 100. Autocorrelator 101 comprises a multiplier 102 and a delay circuit 104. Signal path 100 is connected to one input of multiplier 102. The output of multiplier 102 is connected by signal path 103 to the input of delay circuit 104. The output of delay circuit 104 is connected by signal path 105 to the other input of multiplier 102. It will be appreciated that this method of autocorrelation is commonly used for the detection and decoding of frequency shift keyed (FSK) signals. However, in the preferred embodiment; aautocorrelator 101 is used to detect the data in a phase shift keyed (PSK) signal. Therefore, processor 34 is operated as an FSK receiver for the handshake signal detection.

The output of multiplier 102 of autocorrelator 101 is connected by signal path 103 to the input of a low pass filter at 106. The output of low pass filter 106 is connected by signal path 107 to the input of multiplexer 110. One output of multiplexer 110 is connected by signal path 111 to the input of a "01 sequence detector" 114. The output of detector 114 is connected by signal path 115 to one input of a two input OR-gate 122. The other output of multiplexer 110 is connected by signal path 112 to the input of a second 01 sequence detector 116. The output of detector 116 is connected by signal path 121 to the other input of OR-gate 122. The output of gate 122 on signal path 123 is the 2400 bps handshake sequence detect signal. A 1200 Hertz clock signal is provided by signal path 113 to the switching input of multiplexer 110, a sampling input of detector 116 and the input of inverter 117. The output of inverter 117 is connected by signal path 120 to the sampling input of detector 114.

By multiplexing the data on signal path 107 between detector 114 and detector 116 and OR-ing the outputs of detectors 114 and 116, a reliable 2400 bps handshake signal detection output is obtained. Since the output of low pass filter 110 is alternatively switched between detectors 114 and 116 at a 1200 Hz rate, each detector 114, 116 will only receive one-half of the repeating 0011 handshake signal series. Therefore, one detector will receive the first 0 bit and the first 1 bit in the series, and the other detector will receive the second 0 bit and the second 1 bit in the series. Each detector 114, 116 therefore only needs to look for a repeating 01 series, instead of a repeating 0011 series.

Therefore, an error condition which causes, for example, detector 114 to detect and then to not detect the 01 sequence is unlikely to have the same effect upon the output of detector 116. Therefore, once the 01 sequence is detected, although one of the detectors 114 or 116 may momentarily indicate a lack of 01 sequence detection, the other detector will continue to indicate the presence of the 01 sequence and the output of OR-gate 122 on signal path 123 will continue to indicate the presence of the 2400 bps handshake signal.

Figure 3:
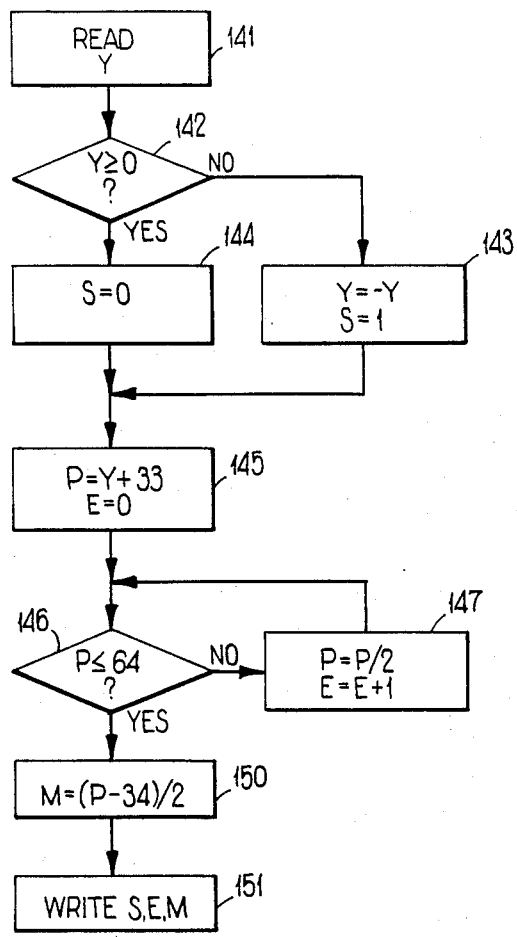
FIG. 3 is a flow chart of the linear-to-mu-law conversion.

Turn now to FIG. 3 which is a flow chart of the process used to convert the modulated signal from a linear signal to a nonlinear (mu-law) signal. This conversion is necessary to compensate for the mu-law characteristics of codec 41. The linear signal, Y, can be represented by the equation $Y=2^E(2M+34)-33$, where Y is 14 bits long including the sign bit, E and M are the exponent and mantissa, respectively, of the mu-law signal, and S is the sign bit of the mu-law signal. Exponent E is 3 bits long and mantissa M is 4 bits long. The first step 141 is to read the value of Y. Next, the sign bit S is determined. In decision 142, if Y is greater than or equal to 0, then step 144 sets the sign bit to 0. However, if Y is less than 0, then step 143 converts Y to a positive value, and sets S=1, which indicates that the original value of Y was negative. Steps 143 and 144 both lead to step 145 wherein the value $P=Y+33$ is determined, and the exponent E is set to 0. Decision 146 determines if P is less than or equal to 64. If not, then step 147 divides P by 2, and increases the exponent E by one, and then returns to step 146. When P is less than or equal to 64 then step 150 sets M equal to (P-34)/2, and step 151 writes the values for S, E, and M to the gate array 15. The 14 bit value for Y has therefore been converted into an 8 bit word which contains a single sign bit, a 3 bit exponent, and a 4 bit mantissa, which compensates for the characteristics of codec 41.

Since codec 41 is a mu-law device for both transmitting and receiving data, the 8 bit received word from codec 41 must be converted into a 14 bit word. Processor 34 accomplishes this by the equation $Y=-2^E(2M+33)-33$. Conversion of the 8 bit S, E, M word to the 14 bit Y word is well known to those skilled in the art. Different equations are used for transmitting and receiving because of the characteristics of codec 41.

Figure 4:
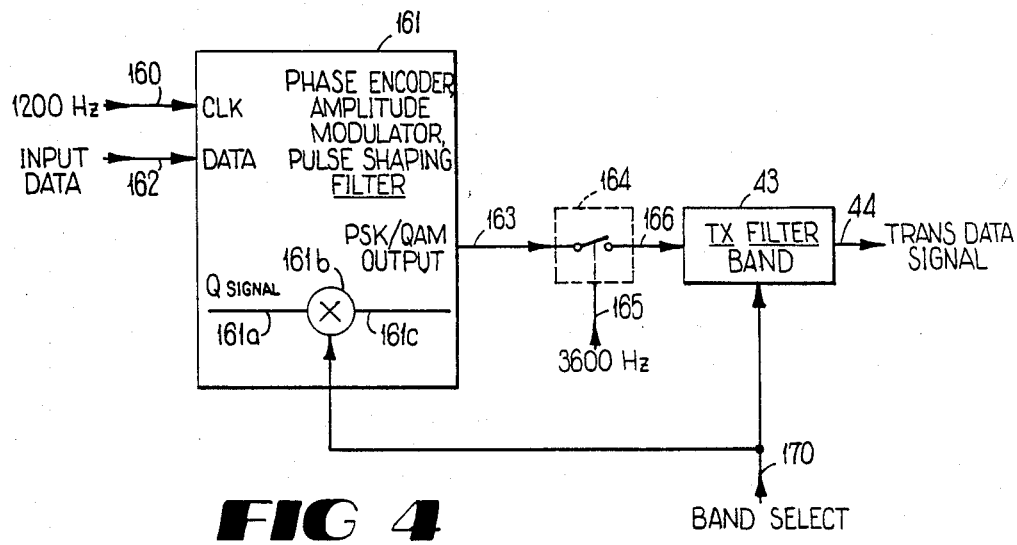
FIG. 4 is a block diagram of the transmitter data carrier generator.

Turn now to FIG. 4 which is a block diagram of the transmitter data carrier generator. Components 161 and 164 of the transmitter data carrier generator of FIG. 4 are implemented in processor 34. Component 161 comprises a phase encoder, amplitude modulator, and pulse shaping filter. With the exception of multiplier 161b, component 161 may be constructed using methods well known to those skilled in the art, or using methods described herein. For convenience, component 161 is referred to hereinafter as modulator 161. A 1200 Hertz signal is provided by signal path 160 to one input of modulator 161. The input data is provided on signal path 162 to the other input of modulator 161. The output of modulator 161 on signal path 163 is therefore a 1200 Hertz carrier which has been phase and amplitude modulated by the input data on conductor 162. The output of modulator 161 is connected by signal path 163 to the input of a sampler 164. A 3600 Hertz signal is provided to the sampling input of sampler 164 by signal path 165 and therefore the signal on conductor 163 is sampled at the rate of 3600 Hertz. The output of sampler 164 is connected to the input of transmitter filter 43 by signal path 166.

It will be appreciated by those skilled in the art that, by sampling the phase and amplitude modulated 1200 Hertz signal on signal path 163, the output of sampler 164 on signal path 166 will comprise the original 1200 Hertz modulated signal, the 3600 Hertz sampling frequency, and a 2400 Hertz (3600-1200) phase and amplitude modulated signal. Other frequency components will, of course, also be present on signal path 166. The effect of sampling the 1200 Hertz modulated signal at 3600 Hertz is the same as mixing or heterodyning a 1200 Hertz modulated signal with a 3600 Hertz reference signal: a difference signal is created. A band select input is provided over signal path 170 to the band select input of transmitter filter 43. The band select signal controls whether transmitter filter 43 operates as a 1200 Hertz bandpass filter or a 2400 Hertz bandpass filter. The output of transmitter filter 43 on conductor 44 is the appropriately selected transmitted data signal. It will be appreciated that signal path 166 comprises gate array 15 and codec 41.

It will be appreciated by those skilled in the art that, if it takes, for example, six digital data points to generate a sine wave then, to generate a 1200 Hertz signal, 7200 digital data points per second will have to be generated. Also, for a 2400 Hertz signal, 14,400 digital data points per second will have to be generated. Therefore, by generating a 1200 Hertz signal and sampling the signal at 3600 Hertz, processor 34 will have to perform fewer operations to generate the 2400 Hertz signal than if it independently generated the 2400 Hertz signal.

Those skilled in the art will appreciate that deriving the 2400 Hz signal in the above manner produces a 2400 Hz signal which is phase inverted and will not be properly received and demodulated. Therefore, modulator 161 also comprises a multiplier 161b. It will be appreciated that, for phase encoding, an I (inphase) signal and a Q (quadrature) phase signal are typically combined to produce an output signal with the desired phase. In the preferred embodiment, the Q signal on signal path 161a is passed through multiplexer 161b before it is combined with the I signal.

The band select signal on signal path 170 is connected to one input of multiplier 161b. If 1200 Hz carrier operation is desired, the band select signal is a +1, which causes no change in the Q signal as it passes through multiplier 161b and appears at signal path 161c. However, if 2400 Hz carrier operation is desired, the band select signal is a −1, which causes a 180 degree phase shift in the Q signal as it passes through multiplier 161. The 180 degree phase shift corrects the phase error caused by the sampling operation of sampler 164. Therefore, the addition of multiplier 161b to modulator 161 results in a properly phased signal on conductor 44 for both 1200 Hz and 2400 Hz operation.

Figure 5:
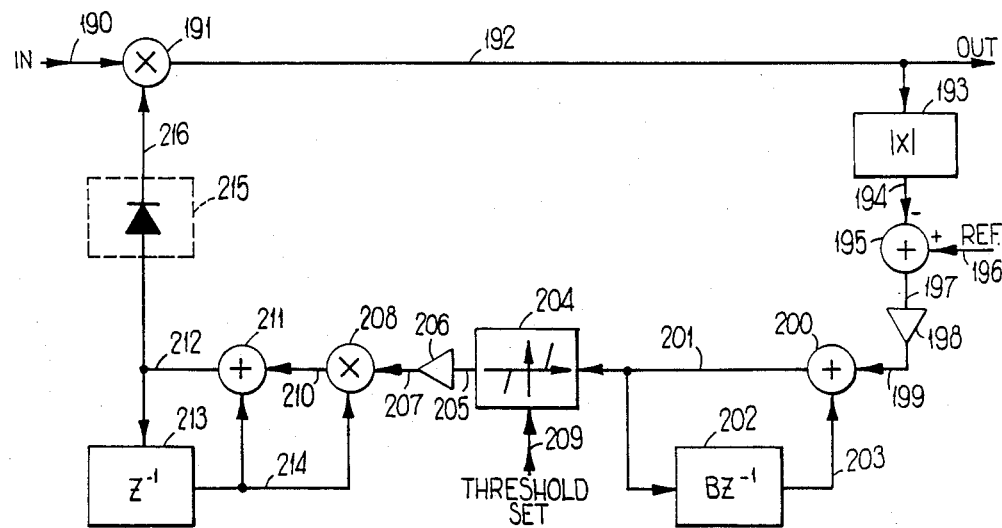
FIG. 5 is a block diagram of the automatic gain control (AGC) circuit.

Turn now to FIG. 5 which is a block diagram of the automatic gain control (AGC) circuit. The AGC circuit is also performed by processor 34. The received data input signal on signal path 190 is provided to one input of a first multiplier 191. The output of multiplier 191 on signal path 192 is the gain adjusted received data signal. The output of multiplier 191 on signal path 192 is connected to the input of an "absolute value of X" stage 193. The output of stage 193 is connected by signal path 194 to the negative input of summer 195. A reference voltage signal is connected by signal path 196 to the positive input of summer 195. The output of summer 195 is connected by signal path 197 to the input of amplifier 198. The gain of amplifier 198 should be small in order not to have noisy AGC output and, in the preferred embodiment, amplifier 198 has a gain of 0.0025.

The output of amplifier 198 is connected by signal path 199 to one input of summer 200. The output of summer 200 is connected by signal path 201 to the input of sampling stage 202 and the input of threshold detector 204. The output of sampler 202 is connected by signal path 203 to the other input of summer 200. The operation of sampler 202 can be characterized as $BZ^{-1}$. Sampler 202 provides a "leakage" signal so that its output will not normally be zero. Therefore, B is chosen to be slightly less than unity, for example, 0.998. It will be appreciated that summer 200 and sampler 202 comprise an integrator.

Threshold detector 204 has a variable threshold setting. The threshold setting value is provided to threshold detector 204 over signal path 209. Threshold detector 204 is characterized by a zero output when the input signal is less than the threshold setting, and an increasing output when the input signal exceeds the threshold setting. Initially the threshold is set at a very small value in order that the AGC circuit may respond quickly, and then a larger threshold value is used so that the AGC circuit has a steady output and is less responsive to noise. The output of threshold detector 204 is connected to the input of amplifier 206 by signal path 205. The gain of amplifier 206 should normally be larger than the gain of amplifier of 198. In the preferred embodiment, the gain of amplifier 206 is 0.625. The output of amplifier 206 is connected by signal path 207 to one input of a multiplier 208. The output of multiplier 208 is connected by signal path 210 to one input of summer 211. The output of summer 211 is connected by conductor 212 to the input of AGC gain rectifier 215 and the input of sampler 213. Sampler 213 is characterized by the equation $Z^{-1}$. AGC gain rectifier 215 is symbolized in FIG. 5 by a diode. In practice, this is implemented by software. If the signal on signal path 212 is a positive value, then the output of AGC gain rectifier 215 is the same positive value. If the signal in signal path 212 is a negative value, then the output of AGC gain rectifier 215 is zero. This prevents occasional negative values on signal path 212 from causing the AGC circuit to select an inappropriate gain. The output of AGC gain rectifier 215 is connected by signal path 216 to the other input of multiplier 191 The output of multiplier 191 on signal path 192 is therefore the gain-corrected received data input signal.

The output of sampler 213 on signal path 214 is connected to the other input of summer 211 and the other input of multiplier 208. It will be appreciated that multiplier 208, summer 211, and sampler 213 also form an integrator. It will also be appreciated that the output of summer 211 on signal path 212 can be represented by the equation:

$$Y_N = Y_{N-1} + EY_{N-1} = Y_{N-1}(1+E),$$

where E is the error signal on conductor 207 and Y is the signal on conductor 212. Therefore, if $Y_{N-1}$ and E are both small, the correction factor $Y_N$ will also be small. However, if $Y_{N-1}$ and E are both large, then the correction value $Y_N$ will also be large. This gives the AGC circuit a nonlinear response so that when the input signal is small the gain variations will also be small, and when the input signal is large the gain variations will be proportionately larger. This allows the AGC circuit to change the AGC gain at a fast rate for large signals and thereby quickly achieve the desired output signal level, and also allows for smaller steps in the change of the AGC gain when the input signal is small so that noise does not cause inappropriate swings in the AGC gain.

It will be appreciated that a quadrature amplitude modulated (QAM) type PSK signal has two levels. A problem frequently encountered with typical AGC circuits is that if the data causes the input signal to remain at one of the two QAM levels for a prolonged period, the typical AGC circuit will change its gain. Then, when the other QAM level appears again, the AGC gain will be incorrect for this other level. In the present invention, the window of threshold detector 204 is made sufficiently large to accommodate both QAM levels. Therefore, as long as the received signal is within the window, there will be no correction of the AGC gain. Therefore, when the input signal is at a first QAM level for a prolonged period, as long as the first QAM level remains within the window there will be no change in the AGC gain. Then, when the second QAM level appears again, the AGC gain will still be the gain required for the proper reception of the input signal.

Figure 6:
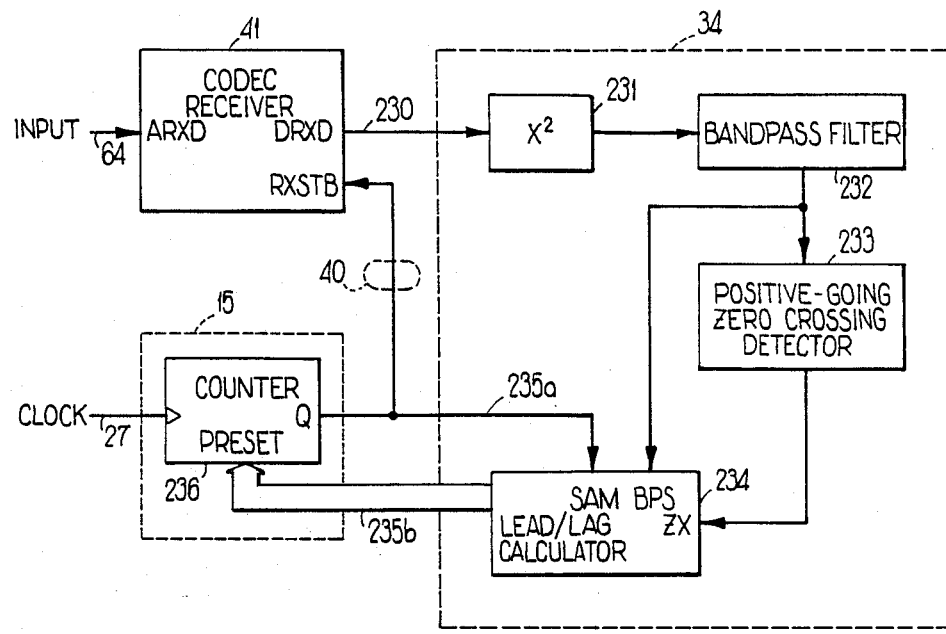
FIG. 6 is a block diagram of the baud timing recovery circuit.

FIG. 6 is a block diagram of the baud timing recovery circuit. Baud timing recovery is required so that equalization and other processes have the optimal data sampling points from which to function. The input signal is provided by conductor 64 to the analog receive data input (ARXD) of the receiver portion of codec 41. Codec receiver 41 samples the input signal at the nominal rate of 7200 samples per second. The circuit shown adjusts the timing of the sample points until one of the sample points exactly coincides with the positive going zero crossing of the filtered 600 Hertz baud clock. This adjustment is done every baud by changing a counter preset which changes the sampling rate. Counter 236 is part of gate array 15. Processor 34 implements the squaring circuit 231, bandpass filter 232, positive going zero crossing detector 233, and lead/lag calculator 234.

After sampling the input signal, codec receiver 41 provides the digital version of the received sample signal to processor 34 over signal path 230. Signal path 230 comprises bus 40, gate array 15, and bus 31 of FIG. 1. Since the input signal on conductor 64 has a spectral null at 600 Hertz, the digital samples are squared by squaring circuit 231. The squared signal is then passed through a 600 Hertz bandpass filter 232 to remove components other than the 600 Hertz baud clock. The bandpass signal is then provided to positive going zero crossing detector 233 which provides a zero crossing output signal whenever the bandpassed signal crosses through zero in a positive going direction. The bandpass signal is also provided to the BPS input of calculator 234.

A clock is provided over conductor 27 to counter 236 of gate array 15. Counter 236 is a presettable counter. The Q output of counter 236 has a nominal frequency of 7200 Hertz. The Q output is the receive data strobe signal (RXSTB) and is provided to codec receiver 41 over one of the conductors of bus 40. The Q output of counter 236 is also provided over signal path 235a to the sample (SAM) input of lead/lag calculator 234. Signal path 235a represents a transfer of data from gate array 15 to processor 34 over data2 bus 31. Calculator operates in two modes: a start-up mode, and then a maintenance mode. In the start-up mode, calculator 234 determines which of the samples is nearest the zero crossing signal provided by detector 233 and determines whether this sample point leads or lags the zero crossing point.

Once the sample point nearest the zero crossing point has been detected, calculator 234 enters the maintenance mode and increments a modulo-12 counter on the occurrence of every sample point. Calculator 234 then monitors the output of bandpass filter 232 and determines the sign of this output. Since the sampling frequency is nominally 7200 Hertz, 7200/12=600 Hertz, which is the baud clock frequency. Thereafter, each time the modulo-12 counter reaches its initial value, calculator 234 determines whether the sample point leads or lags the zero crossing point by inspecting the sign of the output of bandpass filter 232 and adjusts the preset inputs of counter 236 to cause the sample point to occur exactly at the zero crossing point.

If, when the modulo-12 reaches its initial value, the output of filter 232 is negative, then the sample point has occurred before the zero crossing point. Calculator 234 therefore adjusts the preset inputs of counter 236 to cause the input signal to be sampled at a slightly lower rate. Conversely, if the output of filter 232 is positive, then the sample point has occurred after the zero crossing point. Calculator 234 therefore adjusts the preset inputs of counter 236 to cause the input signal to be sampled at a slightly higher rate. The result is that calculator 234 causes a predetermined sample point to occur exactly at the zero crossing point, which is the optimal point for the equalization process and other processes.

Calculator 234 provides the preset inputs to counter 236 over signal path 235b. Signal path 235b represents data transfer from processor 34 to gate array 15 over data2 bus 31.

Figure 7:
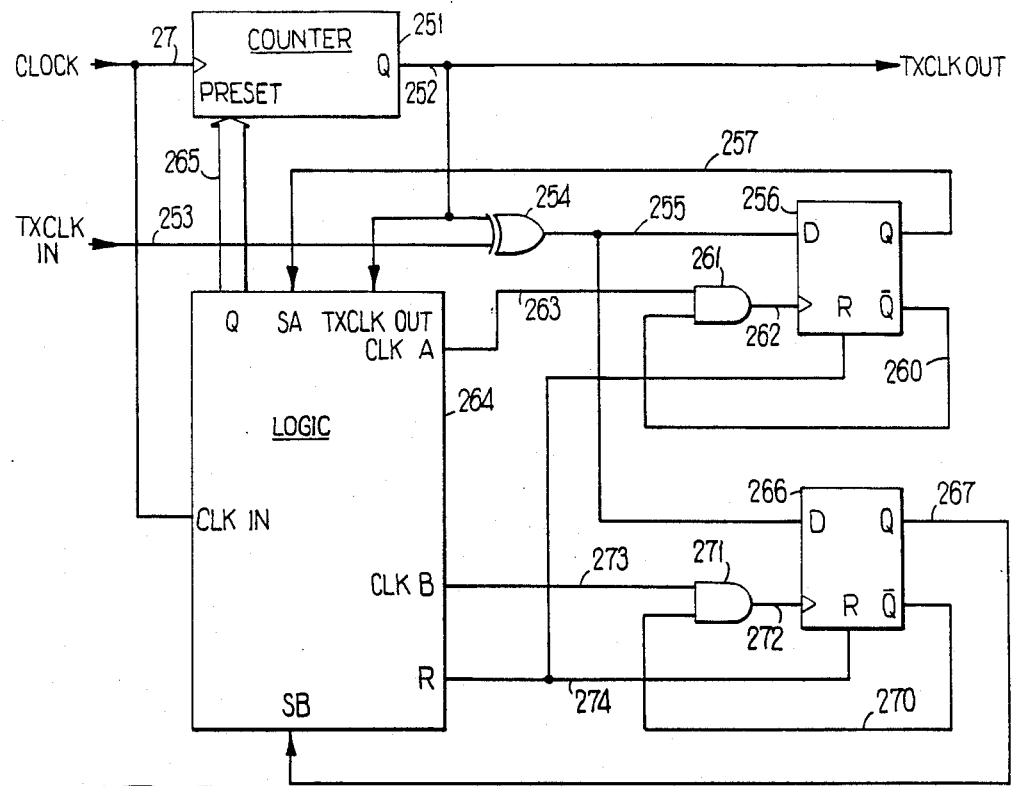
FIG. 7 is a schematic diagram of the transmitter phase-locked loop.

Turn now to FIG. 7, which is a schematic diagram of the transmitter phase-locked loop. This circuit is used whenever it is desired to lock the transmitter bit rate clock to another bit rate clock, such as an incoming bit rate clock. In V0.22/V0.22 bis synchronous mode A the bit rate clock is phase locked to the incoming bit rate clock generated by the data terminal equipment. In V0.22/V0.22 bis synchronous mode C, the bit rate clock is locked to the receive data clock generated by the receiver phase locked loop.

In the preferred embodiment, the circuit of FIG. 7 is implemented in gate array 15. The transmitter phase-locked loop operates by sampling the transmitter clock input (TXCLKIN) and the generated transmitter clock (TXCLKOUT) before and after a rising edge of TXCLKOUT. In the preferred embodiment, if TXCLKOUT lags TXCLKIN by more than 217 nanoseconds or leads TXCLKIN by more than 651 nanoseconds, the phase of TXCLKOUT is adjusted at the bit rate in increments of 434 nanoseconds until the two signals are within 217 nanoseconds, if lagging, or 651 nanoseconds, if leading, of each other. At this point, the phase detector detects zero error (the error is within the window) and does not update the loop until the signals shift out of phase to the point where the error is not within the window.

A clock signal is provided over conductor 27 to the clock input of counter 251 and to the clock in (CLKIN) input of logic circuit 264. Counter 251 is a presettable counter. The Q output of counter 251 on conductor 252 is the TXCLKOUT signal and is connected to one input of exclusive-OR gate 254 and to the TXCLKOUT input of logic circuit 264. The reference signal, TXCLKIN, is provided over conductor 253 to the other input of exclusive-OR gate 254. The output of exclusive-OR gate 254 is connected by conductor 255 to the data inputs of flip-flops 256 and 266. The Q output of flip-flop 256 is connected by conductor 257 to the sample A (SA) input of logic circuit 264. The Q output of flip-flop 266 is connected by conductor 267 to the sample (SB) input of logic circuit 264. The reset of output of logic circuit 264 is connected by conductor 274 to the reset input of flip-flop 256 and of flip-flop 266. Logic circuit 264 resets flip-flops 256 and 266 after it has read the SA and SB signals. This is necessary since a logic 0 on conductors 260 and 270 disables AND-gates 261 and 271, respectively, and prevents further sampling.

The clock A (CLKA) output of logic circuit 264 is connected by conductor 263 to one input of a two input AND-gate 261. The output of AND-gate 261 is connected by conductor 262 to the clock input of flip-flop 256. The negated Q output of flip-flop 256 is connected by conductor 260 to the other input of AND-gate 261. The clock B (CLKB) output of logic circuit 264 is connected by conductor 273 to one input of AND-gate 271. The output of AND-gate 271 is connected by conductor 272 to the clock input of flip-flop 266. The negated Q output of flip-flop 266 is connected by conductor 270 to the other input of AND-gate 271. Exclusive-OR gate 254 performs a comparison of the TXCLKIN and the TXCLKOUT signals. If these two signals are exactly in phase, the output of exclusive-OR gate 254 will be a logic zero. If these two signals are not exactly in phase, then the output of gate 254 will be a logic zero when the two signals have the same state and the logic one when the two signals have a different state. Flip-flop 256 samples the output of gate 254 just prior to a rising edge of the TXCLKOUT signal. Flip-flop 266 samples the output of gate 254 just after the rising edge of the TXCLKOUT signal.

Logic circuit 264 provides the CLKA and CLKB clock signals to flip-flops 256 and 266, respectively. Logic circuit 264 also resets flip-flops 256 and 266 prior to each sample point. Clock CLKA causes the output of gate 254 to be sampled just prior to the rising edge of the TXCLKOUT signal. Clock CLKB causes the output of gate 254 to be sampled just after the rising edge of the TXCLKOUT signal.

Therefore, depending upon the state of signals SA and SB, logic circuit 264 determines whether to speed up or slow down the TXCLKOUT signal. This is accomplished by adjusting the preset inputs to counter 251. Table I shows the meaning of the SA and SB signals. For example, if signals SA and SB are both logic zeros, then the TXCLKIN and TXCLKOUT signals are phase-locked (the error is within the window).

The use of two sampling clocks CLKA and CLKB, which differ slightly in time, also reduces the phase jitter by providing a window wherein the two signals are deemed to be locked. In the preferred embodiment, this window is 868 nanoseconds. It will be appreciated that this 868 nanosecond figure is not mandatory and that larger or smaller window periods can be used to obtain a smaller or a larger degree of phase locking, respectively. Also, in the preferred embodiment, a similar phase locked loop is used to implement the receiver phase locked loop.

TABLE I

| TRANSMITTER PHASE CONDITIONS | | |
|---|---|---|
| SA | SB | MEANING |
| 0 | 0 | LOCK |
| 0 | 1 | TXCLKOUT LEADS |
| 1 | 0 | TXCLKOUT LAGS |
| 1 | 1 | 180 DEGREE ERROR |

Figure 8:
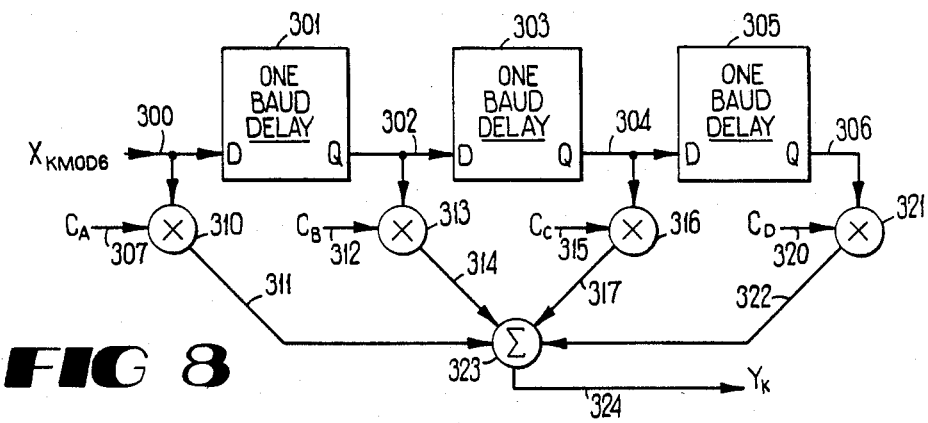
FIG. 8 is a block diagram of the transmitter pulse shaping filter and modulator.

Turn now to FIG. 8 which is a block diagram of the transmitter pulse shaping filter and modulator. In the preferred embodiment, the transmitter pulse shaper and filter is implemented in processor 34. Input signal $X_{KMOD6}$ represents the incoming phase encoded data from a phase encoder (not shown). It will be appreciated that a differential phase encoder is required in the V0.22/V0.22 bis communications mode. In the 2400 bit per second PSK/QAM mode, 4 bits are transmitted for every baud. The first two bits of this quadbit are encoded as a phase change relative to the quadrant occupied by the preceding signal elements. The next two bits of this quadbit are encoded as an amplitude signal. In the preferred embodiment, the phase encoding is done by a look-up table. Initially, phase quadrant one is assumed, and from then on the phase quadrant is changed corresponding to the phase dibit. The table contains the new quadrant to be used, given the previous quadrant and the phase dibit.

Figure 9:
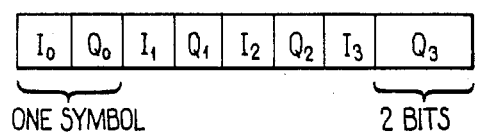
FIG. 9 is an illustration of the sixteen bit IQ storage register.

Prior to reaching the modulator, the phase encoded data is pulse shaped through a 23 tap finite impulse response (FIR) filter. The filter is a square root raised cosine filter with a 75 percent roll-off In the preferred embodiment, a sampling frequency of 3600 Hz is used, and therefore only four symbols will be available in the filter for every baud. The encoded signalling element pairs (inphase and quadrature) are stored in a 16 bit IQ register to form the four symbols. FIG. 9 is an illustration of the 16 bit IQ register and the I and Q values stored in the register. Each I value and each Q value is stored as 2 bits, and an I-Q pair comprises one symbol. A new encoded signalling element (I-Q pair) will come at every baud (equivalent to 6 sampling times) and the 16 bit register shown in FIG. 9 is shifted accordingly.

At every sampling time, the I and Q data pairs are multiplied by a set of four coefficients. The coefficients are updated at every sampling time in the manner shown in Table II. The process is repeated again for the next six sampling times with a new encoded signalling element pair coming in, and so on. Table II illustrates how the coefficients shift with respect to the sampled point in time. Table III gives the value of the coefficients used in the preferred embodiment.

TABLE II

| COEFFICIENT WITH RESPECT TO TIME | | | | |
|---|---|---|---|---|
| SAMPLE TIME | CA | CB | CC | CD |
| 1 | C0 | C6 | C12 | C18 |
| 2 | C1 | C7 | C13 | C19 |
| 3 | C2 | C8 | C14 | C20 |
| 4 | C3 | C9 | C15 | C21 |
| 5 | C4 | C10 | C16 | C22 |
| 6 | C5 | C11 | C17 | C23 |

TABLE III

| COEFFICIENT VALUES | |
|---|---|
| COEFFICIENT | VALUE |
| C0 | 0 |
| C1, C23 | +0.00333 |
| C2, C22 | +0.00512 |
| C3, C21 | +0.00147 |
| C4, C20 | −0.00760 |
| C5, C19 | −0.01723 |
| C6, C18 | −0.01876 |
| C7, C17 | −0.00343 |
| C8, C16 | +0.03268 |
| C9, C15 | +0.08515 |
| C10, C14 | +0.14130 |
| C11, C13 | +0.18458 |
| C12 | +0.20082 |

Returning to FIG. 8, the phase encoded data, $X_{KMOD6}$ is provided over signal path 300 to the data input of a one baud delay circuit 301 and to one input of a multiplier 310. The output of delay 301 is provided over a signal path 302 to the input of another one baud delay 303 and to one input of multiplier 313. The output of delay 303 is provided over signal path 304 to the input of a third one baud delay 305 and to one input of another multiplier 316. The output of delay 305 is provided over signal path 306 to one input of a fourth multiplier 321. Coefficient value $C_A$ is provided over signal path 307 to the other input of multiplier 310. The output of multiplier 310 is provided over signal path 311 to one input of a summer 323. Coefficient $C_B$ is provided over signal path 312 to the other input of multiplier 313. The output of multiplier 313 is provided over signal path 314 to a second input of summer 323. Coefficient $C_C$ is provided over signal path 315 to the second input of multiplier 316. The output of multiplier 316 is provided over signal path 317 to a third input of summer 323. Coefficient $C_D$ is provided over signal path 320 to the other input of multiplier 321. The output of multiplier 321 is provided over signal path 322 to the fourth input of summer 323. The output of summer 323 on signal path 324 represents the phase and amplitude modulated output signal $Y_k$.

Since only four coefficient values, $C_A$, $C_B$, $C_C$, and $C_D$, are used at anyone sample point, only four memory locations are required to store the coefficient values for any sample point. Also, one 16 bit word contains the required phase information for four symbols. This saves memory space and processor 34 operating time. In a hardware implementation, this would save a substantial number of gates and reduce the size of the circuit.

Returning now to FIG. 1, the protocol for the exchange of information between processor 12 and processor 34 will be described. As previously described, all information transferred between processor 12 and processor 34 passes through gate array 15. Most data exchanges between processor 12 and processor 34 require two data words to be passed. The first data word is always passed from processor 12 to processor 34 and is an instruction. Processor 34 contains an internal random access memory (RAM). Page 0 of this RAM is divided into eight subpages of 16 locations each. Each RAM location contains 16 bits. A subpage pointer is used by processor 34 to determine which subpage an address is referring to. This subpage pointer is also contained in the RAM. Processor 34 also contains a page 1 in its RAM, but page 1 is not currently used in the preferred embodiment.

Figure 10:
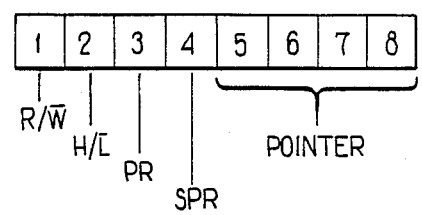
FIG. 10 is an illustration of the instruction data word format.

Tu rn now to FIG. 10 which is an illustration of the first data word. If the read/negated write bit is a logic 0, then bits 5 through 8 define an address in the RAM of processor 34 to be written into within the current subpage in processor 34. A word to be stored in processor 34 will always be sent by processor 12 following this command. If the read/negated write bit is a logic 1, then bits 5 through 8 define an address to be read from within the current subpage in processor 34. Following this command, processor 34 will read the data from its RAM and send the contents to processor 12.

If the software program reset bit (SPR) is a logic 1, then processor 34 performs an internal software reset and disregards the other bits in this word.

If the pointer bit (PR) is a logic 1, then bits 5 through 8 are the new value for the subpage pointer. The other bits in the word are disregarded. If the PR bit is a logic 0, processor 34 will not alter the subpage pointer. If the H/negated L bit is a logic 1, the read or write command refers to the upper eight bits of the addressed 16 bit word in processor 34. If the H/negated L bit is a logic 0, the read or write command refers to the lower eight bits of the addressed word in processor 34.

Therefore, when processor 12 has data to send to processor 34, processor 12 will send a first word which tells processor 34 where in the RAM of processor 34 the data is to be stored. Then processor 12 will send a second word to processor 34, the second word being the data to be stored in that RAM location. Likewise, if processor 12 desires to read data from processor 34, processor 12 will send a first word to processor 34 which defines the location of the data that processor 12 desires. Processor 34 will then read the data from its RAM location and provide this data to processor 12 through gate array 15.

From the above, it will be appreciated that the present invention describes a modem which uses improved digital signal processing and other techniques in order to effect savings in speed, processing time, and memory requirements. It will also be appreciated that standard, well known techniques such as scrambling, descrambling, frequency synthesizing, power supply construction, telephone line interfacing, etc., are available in many printed publications and patents and need not be described herein.

Also, from the detailed description above, it will be appreciated that many modifications and variations of the preferred embodiment will become apparent to those skilled in the art. Therefore, the present invention is to be limited only by the claims below.

We claim:

1. A method for synchronizing a data sampling clock to a baud clock contained in a data signal, said data sampling clock having a nominal frequency of N times a frequency of said baud clock, comprising the steps of:
   (a) sampling said data signal at said frequency of said data sampling clock to provide a sampled data signal;
   (b) squaring said sampled data signal to provide a squared sampled data signal;
   (c) filtering said squared sampled data signal to provide a recovered baud clock;
   (d) determining a sign of said recovered baud clock on every Nth occurrence of said data sampling clock; and
   (e) increasing said frequency of said data sampling clock if said sign is of a predetermined polarity, and decreasing said frequency of said data sampling clock if said sign is of a reverse polarity.

2. The method of claim 1 wherein N equals 12.

3. The method of claim 1 wherein said frequency of said baud clock is 600 Hz and N equals 12.

4. The method or claim 1 wherein said predetermined polarity is a positive polarity.

5. The method of claim 1 wherein said filtering is bandpass filtering using a center frequency approximately equal to said frequency of said baud clock.

6. The method of claim 5 wherein said frequency of said baud clock is 600 Hz.

7. A method for synchronizing a data sampling clock to a baud clock contained in a data signal, said data sampling clock having a nominal frequency of N times a frequency of said baud clock, comprising the steps of:
   (a) a start-up procedure, comprising:
      (1) sampling said data signal to provide a sampled data signal, said sampled data signal comprising a plurality of data signal sample points;
      (2) squaring said sampled data signal to provide a squared sample data signal;
      (3) filtering said squared sampled data signal to provide a recovered baud clock signal;
      (4) detecting a predetermined transition of said recovered baud clock signal; and
      (5) designating a sample point of said plurality of sample points nearest in time to said predetermined transistion as a primary sampling point; and
   (b) a maintenance procedure performed after completion of steps (a) (5)
      (1) sampling said data signal to provide said sampled data signal, said sampled data signal comprising a plurality of data signal sample points;
      (2) squaring said sampled data signal to provide said squared sampled data signal;
      (3) filtering said squared sampled data signal to provide said recovered baud clock signal;
      (4) determining a sign of said recovered baud clock on each Nth occurrence of said data sampling clock, beginning with said occurrence of said data sampling clock corresponding to said primary sampling point; and
      (5) increasing said frequency of said data sampling clock if said sign is of a predetermined polarity and decreasing said frequency of said data sampling clock if said sign is of a reverse polarity.

8. The method of claim 7 wherein N equals 12.

9. The method of claim 7 wherein said frequency of said baud clock is 600 Hz and N equals 12.

10. The method of claim 7 wherein said predetermined polarity is a positive polarity.

11. The method of claim 7 wherein said filtering is bandpass filtering center frequency approximately equal to said frequency of said baud clock.

12. The method of claim 11 wherein said frequency of said baud clock is 600 Hz.

13. Apparatus for synchronizing a data sampling clock to a baud clock having a frequency and contained in an input signal, comprising:
    a clock;
    programmable counter means responsive to said clock and to a count control signal for providing said data sampling clock, said data sampling clock having a nominal frequency of N times said frequency of said baud clock;
    sampling means responsive to said data sampling clock for sampling said input signal to provide a sampled input signal;
    squaring means connected to said sampling means for providing a squared input signal;
    filtering means connected to said squaring means for providing a recovered baud clock signal; and
    calculating means responsive to said data sampling clock and to a sign of said recovered baud clock signal for updating said count control signal on every Nth occurrence of said data sampling clock;
    wherein said frequency of said data sampling clock is increased if said sign is of a first polarity on a said Nth occurrence and decreased if said sign is of a reverse polarity on a said Nth occurrence.

14. The apparatus of claim 13 wherein said programmable counter means comprises a presettable counter.

15. The apparatus of claim 13 wherein said filtering means comprises a bandpass filter.

16. The apparatus of claim 15 wherein said bandpass filter has a center frequency approximately equal to said baud clock frequency.

17. The apparatus of claim 13 wherein N equals 12.

18. The apparatus of claim 13 wherein said predetermined polarity is positive.

19. The apparatus of claim 13 wherein said samping means comprises a coder/decoder receiver.

20. The apparatus of claim 13 wherein said squaring means, said filtering means, and said calculating means are embodied in a microprocessor.

21. The apparatus of claim 13 and further comprising:
zero-crossing detection means responsive to a predetermined transition said recovered baud clock signal for providing a zero-crossing signal;
wherein said sampled input signal comprises a plurality of sampling points; and
wherein said calculating means first designates a sampling point of said plurality of sampling points nearest in time to said predetermined transition as a primary sampling point and is then responsive to said sign for updating said control signal on every Nth occurrence of said data sampling clock beginning with said occurrence of said data sampling clock corresponding to said primary sampling point.

22. The apparatus of claim 21 wherein said squaring means, said filtering means, said calculating means, and said zero-crossing detection means are embodied in a microprocessor.

23. In a modem having means for sending outgoing signals over a telephone line and means for receiving incoming signals over said telephone line, said outgoing signals and said incoming signals corresponding to data being transferred at a rate determined by a baud clock having a frequency, said receiving means including means responsive to a sampling signal for sampling said incoming signals to produce a sampled signal, a sampling signal synchronization circuit for synchronizing said sampling signal to said baud clock in said incoming signals, comprising:
a clock;
programmable counter means responsive said clock and to a count control signal for providing said sampling signal, said sampling signal having a nominal frequency of N times said frequency of said baud clock;
squaring means connected to said sampling means for providing a squared input signal;
filtering means connected to said squaring means for providing a recovered baud clock signal; and
calculating means responsive to said sampling signal and to a sign of said recovered baud clock signal for updating said count control signal on every Nth occurrence of said sampling signal;
wherein said frequency of said sampling signal is increased if said sign is of a first polarity on a said Nth occurrence, and decreased if said sign is of a reverse polarity on a said Nth occurrence.

24. The circuit of claim 23 wherein said programmable counter means comprises a presettable counter.

25. The circuit of claim 24 wherein said filtering means comprises a band pass filter.

26. The circuit of claim 25 wherein said bandpass filter has a center frequency nominally equal to said baud clock frequency.

27. The circuit of claim 23 wherein N equals 12.

28. The circuit of claim 23 wherein said predetermined polarity is positive.

29. The circuit of claim 23 wherein said squaring means, said filtering means and said calculating means are embodied in a microprocessor.

30. The circuit of claim 23 and further comprising:
zero-crossing detection means responsive to a predetermined transition of said recovered baud clock signal for providing a zero-crossing signal;
wherein said sampled signal comprises a plurality of sampling points; and
wherein said calculating means first designates a sampling point of said plurality of sampling points nearest in time to said predetermined transition as a primary sampling point and is then responsive to said sign for updating said control signal on every Nth occurrence of said sampling signal beginning with said occurrence of said sampling signal corresponding to said primary sampling point.

31. The circuit of claim 30 wherein said squaring means, said filtering means, said calculating means, and said zero-crossing detection means are embodied in a microprocessor.

* * * * *